(12) United States Patent
Mo et al.

(10) Patent No.: US 8,599,168 B2
(45) Date of Patent: Dec. 3, 2013

(54) TOUCH DETECTION METHOD AND CIRCUIT FOR CAPACITIVE TOUCH PANELS

(75) Inventors: Lianghua Mo, Shenzhen (CN); Yan Guo, Shenzhen (CN)

(73) Assignee: Focaltech Systems Ltd., Grand Cayman (KY)

( * ) Notice: Subject to any disclaimer, the term of this patent is extended or adjusted under 35 U.S.C. 154(b) by 306 days.

(21) Appl. No.: 13/066,183

(22) Filed: Apr. 7, 2011

(65) Prior Publication Data

US 2011/0248955 A1    Oct. 13, 2011

(30) Foreign Application Priority Data

Apr. 7, 2010 (CN) .......................... 2010 1 0146215

(51) Int. Cl.
*G06F 3/045* (2006.01)
(52) U.S. Cl.
USPC ...................... 345/174; 178/18.06; 178/19.03
(58) Field of Classification Search
USPC ...................... 345/173–183; 178/18.06, 19.03
See application file for complete search history.

(56) References Cited

U.S. PATENT DOCUMENTS

| | | | |
|---|---|---|---|
| 2008/0048990 A1* | 2/2008 | Cho et al. ....................... | 345/173 |
| 2011/0025629 A1* | 2/2011 | Grivna et al. .................. | 345/173 |
| 2011/0163992 A1* | 7/2011 | Cordeiro et al. ............... | 345/174 |

* cited by examiner

*Primary Examiner* — Kevin M Nguyen
(74) *Attorney, Agent, or Firm* — Raymond Y. Chan; David and Raymond Patent Firm

(57) ABSTRACT

A touch detection method for capacitive touch panels includes the steps of scanning the rows and columns of the capacitive matrix of a touch panel respectively; obtaining the capacitance differential value; processing the obtained capacitance differential value; and determining whether there is a touch on the touch panel in response to the processed capacitance differential value. The capacitance differential value is obtained by one of the steps of synchronously scanning two rows at the same time; synchronously scanning two columns at the same time; scanning one row to obtain the capacitance differential value between the row and a reference capacitance; and scanning one column to obtain the capacitance differential value between the column and a reference capacitance. The present invention creates conditions for the elimination of common code interferences and greatly improves the interference resistance of a capacitive touch panel.

3 Claims, 4 Drawing Sheets

US 8,599,168 B2

TOUCH DETECTION METHOD AND CIRCUIT FOR CAPACITIVE TOUCH PANELS

BACKGROUND OF THE PRESENT INVENTION

1. Field of Invention

The invention relates to capacitive touch panels, and in particular to a touch detection method and circuit for capacitive touch panels.

2. Description of Related Arts

FIG. 1 is a general flow chart of a capacitive touch detection method, in which 110 is an equivalent capacitance touch panel. In order to reduce the load of a microprocessor, the scanning of a capacitive touch panel is typically performed row by row or column by column, that is, one row or column is scanned at the same time. In order to represent a touch-caused capacitance change, the capacitance of a scanned row or column is linearly converted to a variable distinguishable to an analog circuit, such as time or frequency, then the variable is subjected to an analog-to-digital conversion, and the result of the conversion is sent to a microprocessor to determine whether there exists a touch.

At present, there are two methods for detecting a touch on a capacitive touch panel. In the first method represented by SiliconLab, a RC is taken as a time constant of an oscillator and different capacitors C are corresponding to different periods or frequencies. The specific realization circuit of this kind of method is illustrated in FIG. 2. In the second method represented by Cypress, the capacitance of a touch capacitor is first converted to the resistance of a resistor by means of the equivalence of a switched capacitor to a resistor, and then the resistor is used to charge or discharge a constant capacitor to detect the change in a corresponding voltage. The specific realization circuit of this kind of method is illustrated in FIG. 4.

In FIG. 2, Ct is a capacitor to be detected. When a comparator Vout outputs a high voltage Vdd, the voltage at the positive terminal of the comparator is equal to 2/3 Vdd, and Ct is charged by Vdd via an R4. The comparator Vout outputs a zero voltage when Ct is charged to 2/3 Vdd, then the voltage at the positive terminal of the comparator is equal to 1/3 Vdd, and Ct is discharged to the ground via R4. When the voltage of Ct is discharged to 1/3 Vdd, the Vout outputs the Vdd to repeat the processing above. FIG. 3 shows voltage waveforms of the Vout and the Ct.

In FIG. 4, Ct is a capacitor to be detected, with a resistance Rt of $1/f^{*Ct}$ (f is a switching frequency), Cm is a fixed capacitor, and Iref is a constant charging current. The greater the capacitance of Ct is, the smaller Rt is, and the lower the charging voltage of Cm is at the same time. Thus, the capacitance value of Ct is converted to a corresponding voltage.

Only a single row or column is scanned at the same time by using said two touch detection methods of Silicon Lab Corporate and Cypress Corporate, which determine the change of a touch capacitance by converting the change of the touch capacitance to that of a frequency, period or voltage; however, the interference on a panel is different at a different period of time, therefore, the result of the detection may be wrong or a detection coordinate may drift with respect to a touch point, leading to a poor interference resistance and an error determination.

SUMMARY OF THE PRESENT INVENTION

A technical problem the present invention aims to address is to provide a touch detection method which is capable of improving the interference resistance of a capacitive touch panel.

Another technical problem the present invention aims to address is to provide a detection circuit for implementing the aforesaid method.

In order to solve said technical problems, the technical solution adopted by the present invention is as follows: a touch detection method for capacitive touch panels comprises the steps of:

(a) scanning the rows and the columns of the capacitive matrix of a touch panel, respectively, (b) obtaining a capacitance differential value by one of the steps of:

synchronously scanning two rows of the capacitive matrix at the same time to obtain the capacitance differential value between the two rows;

synchronously scanning two columns of the capacitive matrix at the same time to obtain the capacitance differential value between the two columns;

scanning one row of the capacitive matrix to obtain the capacitance differential value between the row and a reference capacitance; and scanning one column of the capacitive matrix to obtain the capacitance differential value between the column and a reference capacitance;

(c) processing the obtained capacitance differential value; and (d) determining whether there is a touch on the touch panel in response to the processed capacitance differential value.

In the aforesaid touch detection method for capacitive touch panels, processing the obtained capacitance differential value comprises: getting the absolute capacitance equivalent value of each row or column, wherein in the case where two rows or columns are synchronously scanned at the same time, the absolute capacitance equivalent value of one row or column is equal to the algebraic sum of the absolute capacitance equivalent value of the other row or column and the capacitance differential value between the two rows or columns, and in the case where one row or column is scanned at the same time, the absolute capacitance equivalent value of any row or column is equal to the algebraic sum of the reference capacitance and the capacitance differential value of the row or column and the reference capacitance.

The aforesaid touch detection method for capacitive touch panels comprises a step of getting the relative capacitance equivalent value of a row and a column, wherein the relative capacitance equivalent value of any row or column is equal to the algebraic sum of the relative capacitance equivalent value of another row or column and the capacitance differential value between the two rows or columns.

In the aforesaid touch detection method for capacitive touch panels, the step of getting a capacitance differential value comprises steps of charging, charge sharing, charge difference calculation, sampling and amplification.

According to the aforesaid touch detection method for capacitive touch panels, in said charging step, a first and a second capacitors are charged by a power supply; in said charge sharing step, the charges charged to the first and the second capacitors are shared by two intermediate capacitors that are respectively connected with the first and the second capacitors in parallel; in said charge difference calculation step, the two intermediate capacitors, when disconnected with the first and the second capacitors in charging, are reversely connected to reserve residual charges; and in said sampling and said amplification steps, the value of the residual charges is converted to a directly proportional voltage value and output, wherein the first capacitor is the touch capacitor of a row or column, and the second capacitor is the touch capacitor of another row or column or a reference capacitor with the defined value.

The aforesaid touch detection method for capacitive touch panels comprises a self-checking step, in which the capacitance differential value between rows or columns is obtained as an initial capacitance when the touch panel is not touched or as a transition capacitance differential value when the touch panel is touched, and an effective capacitance differential value is obtained by subtracting a corresponding initial capacitance differential value from the transition capacitance differential value and then processed in the case where the touch panel is touched.

The aforesaid touch detection method for capacitive touch panels comprises an averaging step, in which the average value of at least two capacitance differential values obtained from at least two times of scanning of rows and columns of the capacitive matrix of a touch panel is used as a final capacitance differential value and processed.

The aforesaid touch detection method for capacitive touch panels comprises the following steps of:

getting an initial capacitance threshold and subtracting the initial capacitance threshold from the relative capacitance equivalent value of the row or column to obtain the calculation capacitance of each row or column;

determining whether there exists a segment in the calculation capacitance curve of each row or column where the value is greater than 0, if so, taking the middle point of the curve segment as the coordinate of a touch point corresponding to the curve segment, otherwise, determining there exists no touch; and sending the row coordinate and the column coordinate of each touch point to a processor for proper processing.

According to the technical solution of the present invention, a detection circuit for implementing the aforesaid method comprises: a first capacitor, a second capacitor, a first intermediate capacitor, a second intermediate capacitor, a first switch, a second switch, a third switch, a fourth switch, a fifth switch, a sixth switch, a seventh switch, an eighth switch and a ninth switch, wherein the first end of the first capacitor is connected with a power supply via the first switch, the first end of the second capacitor is connected with the power supply via the second switch; the first end of the first capacitor is connected with that of the first intermediate capacitor via the fifth switch, the first end of the second capacitor is connected with that of the second intermediate capacitor via the sixth switch; the second ends of the first and the second capacitors are respectively grounded, the second end of the first intermediate capacitor is grounded via the seventh switch, the second end of the second intermediate capacitor is grounded via the eighth switch; the first end of the first intermediate capacitor, the second end of the third switch, the second end of the fourth switch and the second end of the second intermediate capacitor are sequentially connected in series; the second end of the first intermediate capacitor is connected with the first end of the second intermediate capacitor via the ninth switch; the first to the fourth switches are switched on during a first and a second periods of time; the fifth to the eighth switches are switched on during a third period of time, and the ninth switch is switched on during the first period of time.

The aforesaid detection circuit comprises an operational amplifier, a fifth capacitor, and a tenth switch, an eleventh switch and a twelfth switch, wherein the fifth capacitor is connected with the tenth switch in parallel to form a circuit unit with one end connected with the inverting input of the operational amplifier and another end connected with the output of the operational amplifier; the inverting input of the operational amplifier is connected with the connection point of the third and the fourth switches, and the non-inverting input of the operational amplifier is connected with a reference level; the connection point of the second end of the first intermediate capacitor and the ninth switch is connected with the reference level via the eleventh switch; the connection point of the first end of the second intermediate capacitor and the ninth switch is connected with the reference level via the twelfth switch; the tenth switch is switched on during the first period of time; and the eleventh and the twelfth switches are switched on during the second period of time.

According to the method of the invention, during a scanning of the rows of the capacitive matrix of a touch panel, two rows or columns are synchronously scanned at the same time to obtain a capacitance differential value between the two rows or columns, or one row or column is scanned at the same time to obtain the capacitance differential value between the row or column and a reference capacitance, and then the obtained capacitance differential value is processed.

The present invention creates conditions for the elimination of common code interferences and greatly improves the interference resistance of a capacitive touch panel.

DETAILED DESCRIPTION OF THE PREFERRED EMBODIMENT

Figure 1:
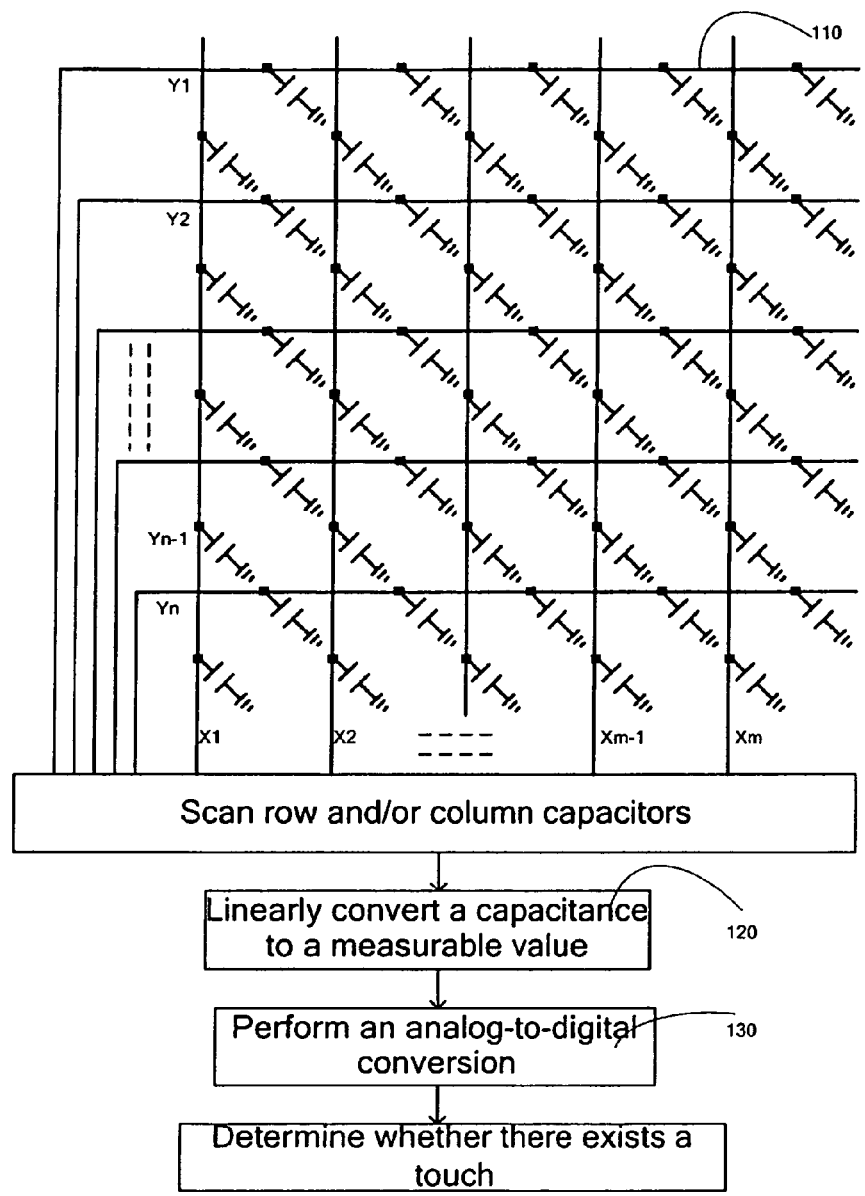
FIG. 1 is a flow chart of a capacitive touch panel detection method of the prior art.
Figure 2:
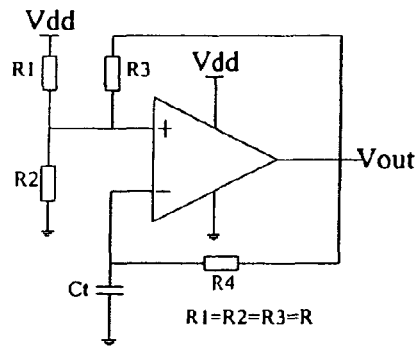
FIG. 2 is a circuit diagram of a SiliconLab touch capacitance detection method of the prior art.
Figure 3:
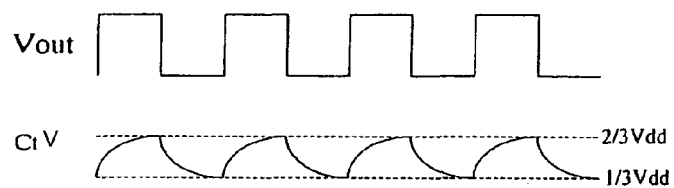
FIG. 3 is a chart illustrating the waveforms of the Vout and Ct used in the method shown in FIG. 2.
Figure 4:
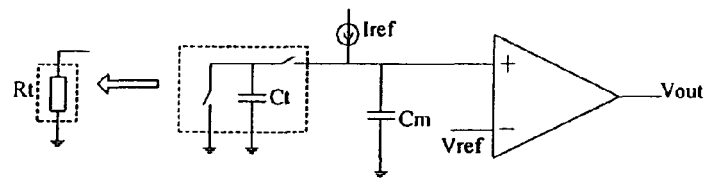
FIG. 4 is a circuit diagram of a Cypress touch capacitance detection method of the prior art.

Aiming at 120 in FIG. 1, the present invention provides a new capacitance detection method, which is capable of synchronously detecting two rows or columns (that is, working in a differential mode) or detecting one row or column at the same time (that is, working in a single-ended mode). Ct1 and Ct2 shown in FIG. 10 refer to the touch capacitors of two rows or columns in the differential working mode and a built-in reference capacitor and the touch capacitor of a row or column in the single-ended working mode. As the two modes are implemented in a substantially identical way, only the working principle of the differential mode is described herein, that is, only the case where two rows or columns are synchronously detected is described. The specific implementation processing is divided into the following five steps: charging, charge sharing, charge difference calculation, sampling and amplification.

Figure 5:
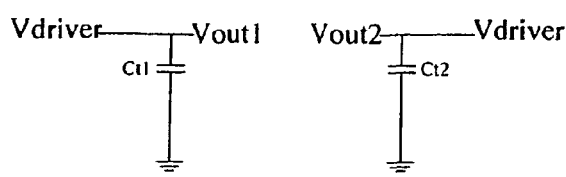
FIG. 5 is a circuit diagram illustrating the charging phase of the touch detection method disclosed in the present invention.

Step 1: Charging:

As shown in FIG. 5, the touch capacitors Ct1 and Ct2 are charged by a power supply Vdriver, and the following result can be achieved after the charging is completed: $V_{out1}=V_{out2}=V_{driver}$, $Q_{t1}=C_{t1}*V_{driver}$ and $Q_{t2}=C_{t2}*V_{driver}$ wherein $Q_{t1}$ and $Q_{t2}$ are the quantities of the charges of Ct1 and Ct2.

Figure 6:
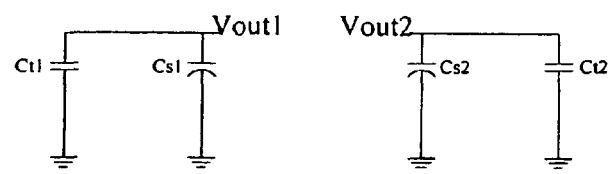
FIG. 6 is a circuit diagram illustrating the charge sharing phase of the touch detection method disclosed in the present invention.

Step 2: Charge Sharing:

As shown in FIG. 6, the charges of Ct1 and Ct2 are shared by Cs1 and Cs2 ($C_{s1}=C_{s2}=C_{s5}$), and then the following equation is obtained based on the law of conservation of charge: $V_{out1}*(C_{t1}+C_s)=C_{t1}*V_{driver}$, equivalently, $V_{out1}=(V_{driver}*C_{t1})/(C_{t1}+C_s)$, and deductively, $Q_{s1}=(V_{driver}*C_s*C_{t1})/(C_{t1}+C_s)$ and $Q_{s2}=(V_{driver}*C_s*C_{t2})/(C_{t2}+C_s)$, wherein $Q_{s1}$ is the quantity of the charges of Cs1, and $Q_{s2}$ is the quantity of the charges of Cs2.

Figure 7:
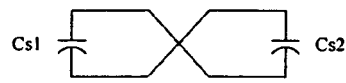
FIG. 7 is a circuit diagram illustrating the charge difference calculation phase of the touch detection method disclosed in the present invention.

Step 3: Charge Difference Calculation:

As shown in FIG. 7, Ct1 and Ct2 are disconnected, the anode of Cs1 is connected with the cathode of Cs2, and the cathode of Cs1 is connected with the anode of Cs2. Thus, the quantity of the residual charges of Cs1 and Cs2 is calculated by the following formula:

$$\Delta Q = Q_{s1} - Q_{s2} = \frac{V_{driver}*C_{t1}*C_s}{C_{t1}+C_s} - \frac{V_{driver}*C_{t2}*C_s}{C_{t2}+C_s},$$

which can be simplified to $$\Delta Q = \frac{V_{driver}*C_s^2*(C_{t1}-C_{t2})}{(C_{t1}+C_s)(C_{t2}+C_s)},$$

and consequentially, the voltage difference between the anode and cathode of Cs1 can be calculated by the following formula:

$$\Delta V = \frac{V_{driver}*C_s*(C_{t1}-C_{t2})}{2(C_{t1}+C_s)(C_{t2}+C_s)}.$$

In order to improve the signal-to-noise ratio of the circuit, $\Delta V$ should be as high as possible. For a self-capacitance touch panel, there exists the following equation: $C_{t1}-C_{t2}\approx\pm(2\sim5)\% C_{t1}$ or $C_{t1}-C_{t2}\approx\pm(2\sim5)\% C_{t2}$, from which the following equivalent can be derived: $C_{t1}+C_s=C_{t2}+C_s=C_t+C_s$ and $C_{t1}-C_{t2}=\delta C_t$, that is, $$\Delta V = \frac{V_{driver}*\delta C_t*C_s}{2*(C_t+C_s)^2},$$

to and then the following conclusion can be obtained from a derivation on the equation above that: $\Delta V$ reaches its maximum value $V_{driver}/8\delta$ when Cs is equal to Ct, wherein $\delta$ is the change proportion of the touch capacitance. Through the difference calculation process, the interference caused by an external signal on the touch panel can be eliminated.

Figure 8:
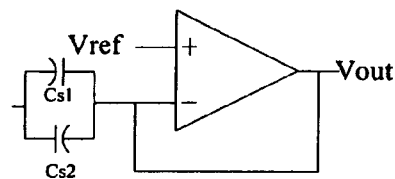
FIG. 8 is a circuit diagram illustrating the voltage sampling phase of the touch detection method disclosed in the present invention.

Step 4: Sampling:

As shown in FIG. 8, as there exists no current path in Cs1 and Cs2, the voltage difference at two ends of Cs1 and Cs2 is invariable, that is, $V_{out}=V_{ref}$.

Figure 9:
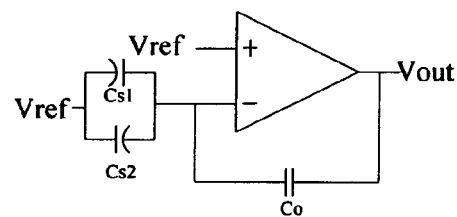
FIG. 9 is a circuit diagram illustrating the voltage amplification phase of the touch detection method disclosed in the present invention.

Step 5: Amplification:

As shown in FIG. 9, due to the 'virtual short circuit' effect of the operational amplifier, the residual charges of Cs1 and Cs2 are totally transferred to Co (as shown in FIG. 9), then the voltage difference between the two ends of Co can be calculated by the following formula:

$$\Delta V_o = \frac{\Delta Q}{C_o} = \frac{V_{driver}*C_s^2*(C_{t1}-C_{t2})}{(C_{t1}+C_s)(C_{t2}+C_s)*C_o}.$$

At this time, $$V_{out} = V_{ref} - \Delta V_o = V_{ref} - \frac{V_{driver}*C_s^2*(C_{t1}-C_{t2})}{(C_{t1}+C_s)(C_{t2}+C_s)*C_o}.$$

According to the analysis above, the following equation can be obtained when $C_s=C_t$, $C_{t1}-C_{t2}=\delta C_t$, $C_{t1}+C_s\approx C_t+C_s$, and $C_{t2}+C_s\approx C_t+C_s$:

$$V_{out} = V_{ref} - \Delta V_o = V_{ref} - \frac{V_{driver}*\delta C_t}{4C_o}.$$

Then, it can be learned from the equation above that the change in a touch capacitance can be detected by detecting Vout.

In this way, the following conclusion is obtained: $V_{out}$ is equal to $V_{ref}$ when $V_{driver}=18V$, $C_t=50$ pF, $C_s=50$ pF, $\delta=-3\%$ and $C_o=10$ pF (corresponding to the maintenance phase shown in FIG. 9), and $V_{out}$ is equal to $V_{ref}+0.675V$ during an amplification phase, that is, 3% of capacitance is converted to 0.675 V during the amplification phase.

Figure 10:
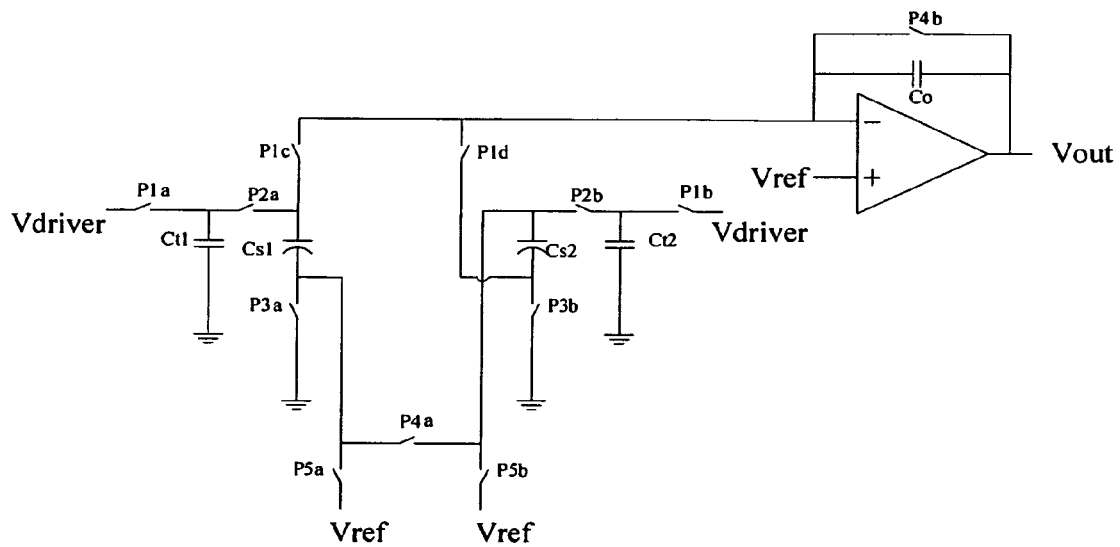
FIG. 10 is a unit circuit diagram of a circuit for implementing the detection method disclosed in the present invention.

As shown in FIG. 10, the unit circuit of a detection circuit for implementing the touch detection method for capacitive touch panels provided in this invention comprises: an operational amplifier, a first capacitor Ct1 and a second capacitor Ct2 (one is a touch capacitor and the other is a built-in reference capacitor in the single-ended mode and are both touch capacitors in the differential mode), a first intermediate capacitor Cs1, a second intermediate capacitor Cs2, a fifth capacitor C0, a first switch P1a, a second switch P1b, a third switch P1c, a fourth switch P1d, a fifth switch P2a, a sixth switch P2b, a seventh switch P3a, an eighth switch P3b, a ninth switch P4a, a tenth switch P4b, an eleventh switch P5a and a twelfth switch P5b. The first and the second capacitors Ct1 and Ct2 are touch capacitors of two adjacent rows or columns of the capacitive matrix of a touch panel respectively.

The first end of the first capacitor Ct1 is connected with a power supply Vdriver via the first switch P1a, the first end of the second capacitor Ct2 is connected with the power supply Vdriver via the second switch P1b; the first end of the first capacitor Ct1 is connected with that of the first intermediate capacitor Cs1 via the fifth switch P2a, the first end of the second capacitor Ct2 is connected with that of the second intermediate capacitor Cs2 via the sixth switch P2b; the second ends of the first and the second capacitors Ct1 and Ct2 are respectively grounded; the second end of the first intermediate capacitor Cs1 is grounded via the seventh switch P3a; the second end of the second intermediate capacitor Cs2 is grounded via the eighth switch P3b; the first end of the first intermediate capacitor Cs1, the third switch P1c, the fourth switch P1d and the second end of the second intermediate capacitor Cs2 are sequentially connected in series; the second end of the first intermediate capacitor Cs1 is connected with the first end of the second intermediate capacitor Cs2 via the ninth switch P4a; the fifth capacitor C0 is connected with the tenth switch P4b in parallel to form a circuit unit with one end connected with the inverting input of the operational amplifier and another end connected with the output of the operational amplifier; the inverting input of the operational amplifier is connected with the connection point of the third and the fourth switches P1c and P1d, and the non-inverting input of the operational amplifier is connected with a reference level Vref; the connection point of the second end of the first intermediate capacitor Cs1 and the ninth switch P4a is connected with the reference level Vref via the eleventh switch P5a; the connection point of the first end of the second intermediate capacitor Cs2 and the ninth switch P4a is connected with the reference level Vref via the twelfth switch P5b.

The first, the second, the third and the fourth switches P1a, P1b, P1c and P1d are switched on during a first and a second periods of time t1 and t2; the fifth, the sixth, the seventh and the eighth switches P2a, P2b, P3a and P3b are switched on during a third period of time t3; the ninth and the tenth switches P4a and P4b are switched on during the first period of time t1; and the eleventh and the twelfth switches P5a and P5b are switched on during the second period of time t2.

Figure 11:
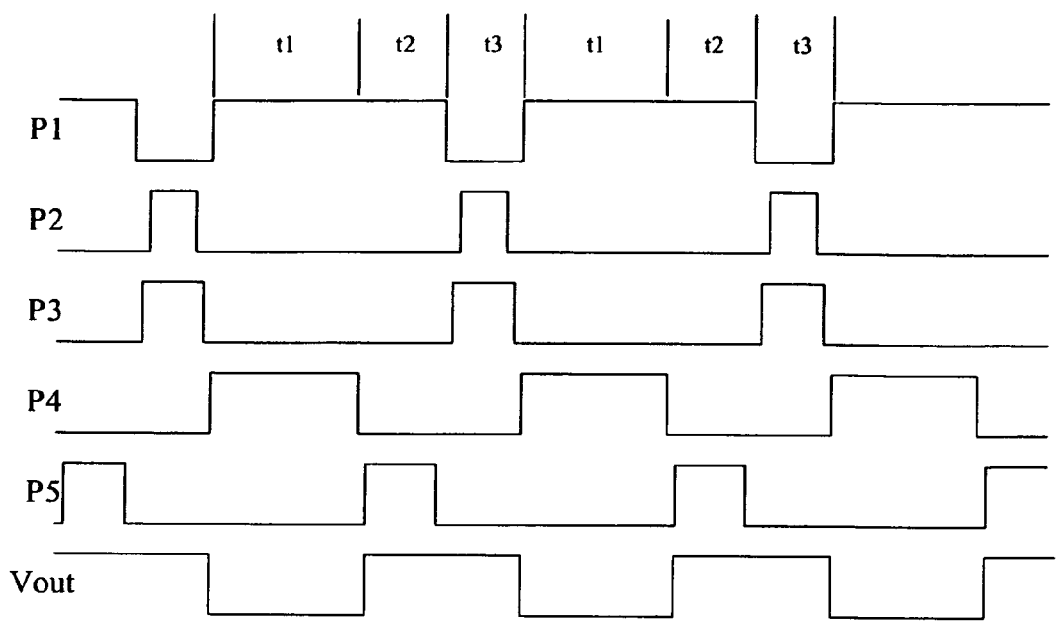
FIG. 11 is a sequence chart of the touch detection method disclosed in the present invention.

The first through the twelfth switches, which can be MOS tubes, are switched on or off by a sequence circuit and are switched on when their control ends are high in level. The corresponding sequence chart is shown in FIG. 11.

During the first and the second periods of time t1 and t2, the power supply Vdriver charges the touch capacitors Ct1 and Ct2 of two adjacent rows or columns; during the third period of time t3, the charges of the touch capacitors Ct1 and Ct2 are shared by the two intermediate capacitors Cs1 and Cs2 that are respectively connected with the touch capacitors in parallel (charge sharing); during the first period of time t1 of the following cycle, the two intermediate capacitors Cs1 and Cs2, when disconnected with the touch capacitors Ct1 and Ct2, are inversely connected to reserve residual charges (charge difference calculation accompanied with sampling); and during the second period of time of the following cycle, the value of the residual charges of the touch capacitors Ct1 and Ct2 are converted to an output Vout in direct proportion to the residual charges.

130 shown in FIG. 1 consists of an analog-to-digital converter, which, in consideration of the accuracy required by a touch panel detection method, may be an ADC of more than 8 bits. Matched with the sequence shown in FIG. 11, a sampling can be performed during the high-level period of P3 and a conversion and output during the high-level period of P4. In order to increase the signal-to-noise ratio, the conversion can be performed for many times, and the values resulting from the many times of conversion are averaged.

In order to prevent inconsistency between the row capacitances and/or column capacitances of a capacitive touch panel caused by production technology, a self check is performed on the initial capacitances, that is, the difference between two detected rows or columns of channels is recorded as x0 in the case of no touch and x1 in the case of a touch, and then the effective difference caused by the touch is x1-x0 can be obtained.

A Preferred Embodiment of Differential Mode

As shown in FIG. 1, there are totally n rows and m columns. A row capacitor matrix is firstly scanned, wherein two rows are scanned at the same time to obtain the capacitance differential value between the two adjacent rows; for the n rows, the scanning should be performed n−1 times to obtain n−1 data, and similarly, for a column capacitor matrix, m−1 data can be obtained. In the case of no touch, the n+m−2 data are used as mismatch data of the row and column capacitors. The difference between the n+m−2 data obtained in the case of a touch and the n+m−2 data obtained in the case of no touch is the capacitance differential value between two adjacent rows or columns caused by the touch.

Figure 12:
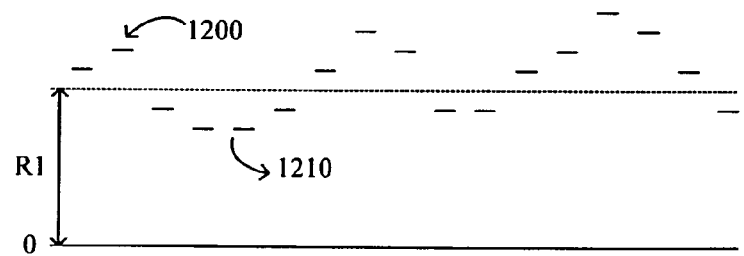
FIG. 12 is an absolute capacitance equivalent value chart of the touch detection method disclosed in the present invention.

Provided that the scanned capacitance differential value between the $(n-1)^{th}$ row and the $n^{th}$ row is $R_{n-(n-1)}$ and the absolute capacitance equivalent value of the $n^{th}$ row is Rn, the absolute capacitance equivalent value of each row can be reduced by the following method in which:

as shown in FIG. 12, by taking the absolute capacitance equivalent value R1 of the first row as a reference, the following equations can be obtained: $R2=R1+R2-R1=R1+R_{2-1}$, $R3=R2+R3-R2=R1+R_{2-1}+R_{3-2}$, $R4=R3+R4-R3=R1+R_{2-1}+R_{3-2}+R_{4-3}$, and similarly, $Rn=Rn-1+Rn-Rn-1=R1+R_{2-1}+R_{3-2}+R_{4-3}\ldots R_{n-(n-1)}$, wherein R2 is the absolute capacitance equivalent value of the second row, R3 is the absolute capacitance equivalent value of the third row, R4 is the absolute capacitance equivalent value of the fourth row, and Rn is the absolute capacitance equivalent value of the n.sup.th row, and 1200 shown in FIG. 12 represents the absolute capacitance equivalent value of a corresponding row.

Figure 13:
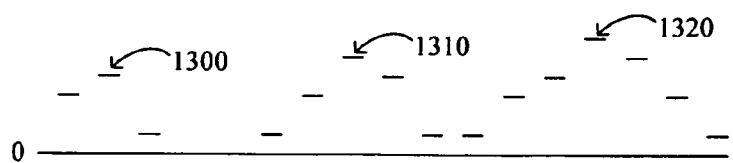
FIG. 13 is a relative capacitance chart of the touch detection method disclosed in the present invention.

As shown in FIG. 12, for a self-capacitance panel, a touch will lead to an increase in capacitance. A row will have the minimum capacitance 1210 as long as it is not touched, corresponding to 1210 shown in the FIG. 12. The relative capacitance data 1300, 1310 and 1320 shown in FIG. 13 can be obtained from a value calculation that is carried out taking 1210 as a reference. A column coordinate can be calculated by using the following method, and a touch coordinate can be obtained by combining a row coordinate with a column coordinate.

For the sake of a convenient description, in the scanning mode above, two adjacent rows or columns are selected for each scanning, but actually, any two rows or columns can be scanned at the same time since the desired data can be obtained as long as each row or column is scanned.

During the capacitance data processing, in order to reduce the volume of the capacitance data to be processed, an initial capacitance threshold, which is greater than the aforesaid minimum capacitance, is obtained first. Then the calculation capacitance of each row or column is calculated by subtracting the initial capacitance threshold from the relative capacitance equivalent value of the row or column, and the calculation capacitances that are greater than 0 are reserved. Sequentially, a determination is made on whether there exists a segment in a calculation capacitance curve of the row or column where the value is greater than 0. If so, the center of gravity of the curve segment is taken as the coordinate of a touch point corresponding to the curve segment; otherwise, it is considered that there exists no touch. Finally, the column and row coordinates of each touch point are sent to the processor to process. As the data volume of the touch point is small, the volume of the data finally processed by the processor is greatly decreased after a selection is performed based on the initial capacitance threshold.

What is claimed is:

1. A touch detection method for capacitive touch panels comprising the steps of:

(a) scanning rows and columns of a capacitive matrix of a touch panel respectively,
(b) obtaining a capacitance differential value by one of the steps of:
synchronously scanning two rows of the capacitive matrix at the same time to obtain the capacitance differential value between the two rows;
synchronously scanning two columns of the capacitive matrix at the same time to obtain the capacitance differential value between the two columns;
scanning one row of the capacitive matrix to obtain the capacitance differential value between the row and a reference capacitance; and
scanning one column of the capacitive matrix to obtain the capacitance differential value between the column and a reference capacitance;
(c) processing the obtained capacitance differential value; and
(d) determining whether there is a touch on the touch panel in response to the processed capacitance differential value; wherein the step (b) further comprises steps of charging, charge sharing, charge difference calculation, sampling and amplification, wherein in said charging step, a first and a second capacitors are charged by a power supply; in said charge sharing step, the charges charged to the first and the second capacitors are shared by two intermediate capacitors that are respectively connected with the first and the second capacitors in parallel; in said charge difference calculation step, the two intermediate capacitors, when disconnected with the first and the second capacitors, are reversely connected to reserve residual charges; and in said sampling and said amplification steps, the value of the residual charges is converted to a directly proportional voltage value and output, wherein the first capacitor is the touch capacitor of a row or column, and the second capacitor is the touch capacitor of another row or column or a reference capacitor with the defined value.

2. A detection circuit, comprising: a first capacitor, a second capacitor, a first intermediate capacitor, a second intermediate capacitor, a first switch, a second switch, a third switch, a fourth switch, a fifth switch, a sixth switch, a seventh switch, an eighth switch and a ninth switch, wherein the first end of the first capacitor is connected with a power supply via the first switch, the first end of the second capacitor is connected with the power supply via the second switch; the first end of the first capacitor is connected with that of the first intermediate capacitor via the fifth switch, the first end of the second capacitor is connected with that of the second intermediate capacitor via the sixth switch; the second ends of the first and the second capacitors are respectively grounded, the second end of the first intermediate capacitor is grounded via the seventh switch, the second end of the second intermediate capacitor is grounded via the eighth switch; the first end of the first intermediate capacitor, the third switch, the fourth switch and the second end of the second intermediate capacitor are sequentially connected in series; the second end of the first intermediate capacitor is connected with the first end of the second intermediate capacitor via the ninth switch; the first to the fourth switches are switched on during a first and a second periods of time; the fifth to the eighth switches are switched on during a third period of time, and the ninth switch is switched on during the first period of time, wherein the detection circuit provides a touch detection method for capacitive touch panels comprising the steps of:
(a) scanning rows and columns of a capacitive matrix of a touch panel respectively,
(b) during the scanning of the rows or columns of the capacitive matrix of the touch panel, obtaining a capacitance differential value by one of the steps of:
synchronously scanning two rows or columns at the same time to obtain the capacitance differential value between the two rows or columns; and
scanning one of the row and column at the same time to obtain the capacitance differential value between the row or column and a reference capacitance;
(c) processing the obtained capacitance differential value; and
(d) determining wherein there is a touch on the touch panel.

3. A detection circuit according to claim 2, further comprising: an operational amplifier, a fifth capacitor, a tenth switch, an eleventh switch and a twelfth switch, wherein the fifth capacitor is connected with the tenth switch in parallel to form a circuit unit with one end connected with the inverting input of the operational amplifier and another end connected with the output of the operational amplifier; the inverting input of the operational amplifier is connected with the connection point of the third and the fourth switches, and the non-inverting input of the operational amplifier is connected with a reference level; the connection point of the second end of the first intermediate capacitor and the ninth switch is connected with the reference level via the eleventh switch; the connection point of the first end of the second intermediate capacitor and the ninth switch is connected with the reference level via the twelfth switch; the tenth switch is switched on during the first period of time; and the eleventh and the twelfth switches are switched on during the second period of time.

* * * * *